United States Patent [19]

Fujiwara et al.

[11] Patent Number: 5,142,391
[45] Date of Patent: Aug. 25, 1992

[54] LIQUID-CRYSTAL DISPLAY DEVICE OF OPTICAL WRITING TYPE HAVING A LIGHT ABSORBING LAYER COMPOSED OF A CARBON-DISPERSED SYSTEM COATING

[75] Inventors: Sayuri Fujiwara; Naofumi Kimura, both of Nara, Japan

[73] Assignee: Sharp Kabushiki Kaisha, Osaka, Japan

[21] Appl. No.: 689,332

[22] Filed: Apr. 22, 1991

[30] Foreign Application Priority Data

Apr. 27, 1990 [JP] Japan ................................. 2-113453

[51] Int. Cl.$^5$ ............................................. G02F 1/13
[52] U.S. Cl. ........................................ 359/67; 359/71; 359/72
[58] Field of Search ................... 350/342, 334, 339 R, 350/338, 331 R; 359/67, 70, 71, 72, 80

[56] References Cited

U.S. PATENT DOCUMENTS

| | | | |
|---|---|---|---|
| 3,601,610 | 8/1971 | Nakamura et al. | 250/211 |
| 3,976,361 | 8/1976 | Fraas et al. | 350/342 |
| 4,125,319 | 11/1978 | Frank et al. | 350/362 |
| 4,925,276 | 5/1990 | McMurray et al. | 350/342 |
| 4,941,735 | 7/1990 | Moddel et al. | 350/342 |

FOREIGN PATENT DOCUMENTS 0329427 8/1989 European Pat. Off. .

OTHER PUBLICATIONS

Patent Abstracts of Japan, vol. 12, No. 383, p. 770, Oct. 13, 1988.

*Primary Examiner*—Stanley D. Miller
*Assistant Examiner*—Huy K. Mai
*Attorney, Agent, or Firm*—David G. Conlin; Donald R. Castle; Ernest V. Linek

[57] ABSTRACT

A liquid-crystal display device of optical writing type includes a first transparent substrate, a first transparent electrode layer formed on the first transparent substrate, a photoconductive layer formed on the first transparent electrode layer, a light-absorbing layer composed of an organic film, the light-absorbing layer formed on the photoconductive layer, a dielectric layer formed on the light-absorbing layer, a second transparent substrate, a second transparent electrode layer formed on the second transparent substrate, and a liquid-crystal layer disposed between the second transparent electrode layer and the dielectric layer.

17 Claims, 4 Drawing Sheets

LIQUID-CRYSTAL DISPLAY DEVICE OF OPTICAL WRITING TYPE HAVING A LIGHT ABSORBING LAYER COMPOSED OF A CARBON-DISPERSED SYSTEM COATING

BACKGROUND OF THE INVENTION

1. Field of the Invention

The present invention relates to a liquid-crystal display device of optical writing type.

2. Description of the Related Art

The inventors of the present invention know that a liquid-crystal display device of optical writing type is typically used as a liquid-crystal light valve.

Such the liquid-crystal display device of optical writing type includes two transparent electrodes located in opposition to each other. On the first transparent electrode, there is formed a photoconductive layer made of hydrogenated amorphous silicon (a-Si:H). On the photoconductive layer, there is formed a light-absorbing layer made of a metal thin film such as a C (carbon) film or an Ag (silver) film, and so on. On the light-absorbing layer, there is formed a dielectric mirror layer composed of a multi-layer film made of $TiO_2$ (titanium dioxide) and $SiO_2$ (silicon dioxde), of ZnS (zinc sulfide) and MgF (magnesium fluoride), and so on. Between the dielectric mirror layer and the second transparent electrode, liquid-crystal layer consisted of liquid-crystal elements is closed through an orientation film.

The dielectric mirror layer is arranged so as to reflect a projected ray of light for reading an image data written in the liquid-crystal elements of the liquid-crystal layer so that the projected ray of light comes out from the liquid-crystal elements, and to reflect the projected ray of light with a high reflectance for preventing the reflected ray of light from an incidence to the photoconductive layer. The light-absorbing layer is arranged so as to prevent a ray of light used for writing an image data from a re-reflection against the photoconductive layer, and to prevent the projected ray of light for reading out passed through the dielectric mirror layer.

As will be understood from the above, the projected ray of light for reading out, which is passed through the liquid-crystal layer, is reflected on the dielectric mirror layer, and then outgoes from the liquid-crystal display device. However, the dielectric mirror layer has a reflectance of about 95%. It means that about 5% of the projected ray of light is allowed to pass through the dielectric mirror layer. When the ray of light passed through the dielectric mirror layer is incident to the overall surface of the photoconductive layer, the image information written by the ray of light for writing will disappear. In order to prevent this shortcoming, the light-absorbing layer is provided between the dielectric mirror layer and the photoconductive layer. The ray of light incident on the liquid-crystal layer has an intensity of about 1 W. On the other hand, in case the photoconductive layer is formed of hydrogenated amorphous silicon (a-Si:H), this photoconductive layer changes its conductivity in response to the ray of light having an intensity of several tens $\mu$ W or more. In this case, hence, it is necessary to reduce the intensity value of the ray of light incident to the photoconductive layer by four to five digits by means of the dielectric mirror layer and the light-absorbing layer.

For this purpose, it is possible to take one measure for enhancing a reflectance of the dielectric mirror layer. As a result, the dielectric mirror layer is required to have more laminated dielectric mirrors. With more dielectric mirrors being laminated, the dielectric mirror layer keeps thicker and thicker, resulting in bringing about difficulty in applying a sufficient voltage to the liquid-crystal layer.

In order to cope with that shortcoming, the foregoing liquid-crystal display device of optical writing type has the light-absorbing layer composed of a metal thin film such as a carbon film or a silver film for the purpose of lowering the intensity value of light by four digits or more.

In case of using as the light-absorbing layer the metal thin film such as carbon or silver, the light-absorbing layer has a high conductivity. As a result, the photoconductive layer keeps a higher conductivity. Hence, it is necessary to keep the metal thin film patterned in the liquid-crystal display device. As a result of patterning the metal thin film, the manufacturing process becomes technically difficult for obtaining high resolution. Moreover, since inferior adhesion appears between the metal film such as a carbon film or a silver film and hydrogenated amorphous silicon (a-Si:H), the light-absorbing layer is likely to be stripped off the photoconductive layer.

SUMMARY OF THE INVENTION

It is therefore an object of the present invention to provide a liquid-crystal display device of optical writing type, which is allowed to be manufactured with a simple manufacturing process and has excellent resolution.

The object of the invention can be achieved by the liquid-crystal display device of optical writing type including:

a first transparent substrate;

a first transparent electrode layer formed on the first transparent substrate;

a photoconductive layer formed on the first transparent electrode layer;

a light-absorbing layer composed of an organic film, the light-absorbing layer formed on the photoconductive layer;

a dielectric layer formed on the light-absorbing layer;

a second transparent substrate;

a second transparent electrode layer formed on the second transparent substrate; and a liquid-crystal layer disposed between the second transparent electrode layer and the dielectric layer.

In operation, the liquid-crystal display device of optical writing type has the organic film with comparatively high resistance as the light-absorbing layer, the organic film belongs to a carbon-dispersed system. It results in being able to form the light-absorbing layer having an excellent capability of blocking light and no requirement of being patterned.

The light-absorbing layer composed of an organic film serves to eliminate the necessity of patterning the light-absorbing layer itself, resulting in being able to obtain the high-resolution liquid-crystal display device of optical writing type with the simple manufacturing process.

Further objects and advantages of the present invention will be apparent from the following description of the preferred embodiments of the invention as illustrated in the accompanying drawings.

DESCRIPTION OF THE PREFERRED EMBODIMENTS

A preferred embodiment of the present invention will be described below with reference to the accompanying drawings.

Figure 1:
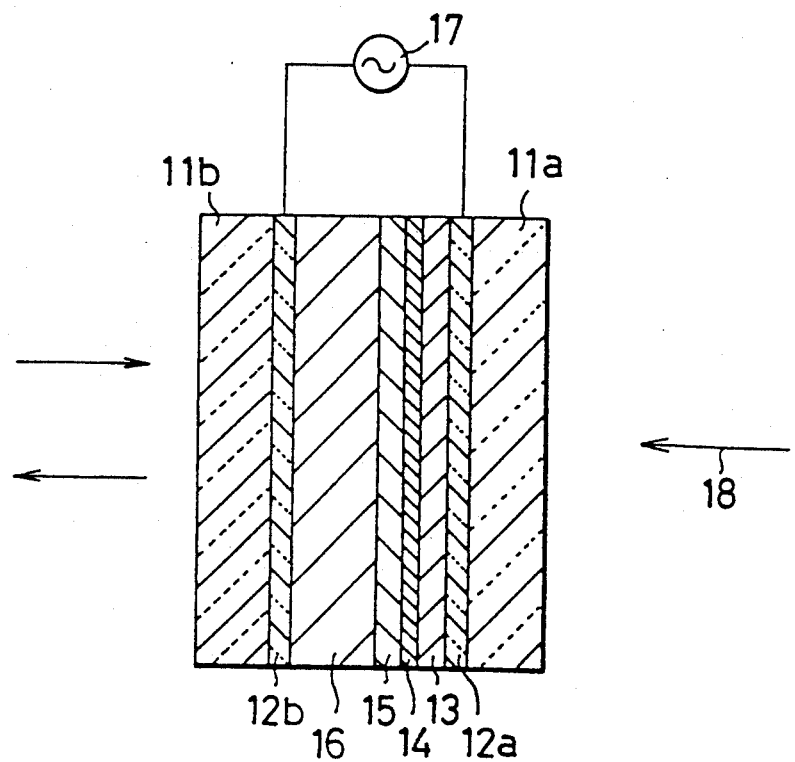
FIG. 1 is a sectional view showing a construction of a liquid-crystal display device of optical writing type according to an embodiment of the present invention.

FIG. 1 is a sectional view showing the liquid-crystal display device of optical writing type according to the first embodiment of the present invention.

As shown in FIG. 1, 11a denotes a glass plate. The glass plate 11a provides a transparent electrode film 12a laminated on the overall surface of the glass plate itself by means of the sputtering method. The transparent electrode film 12a consists of an ITO (Indium Tin Oxide) transparent conductive film and an $SnO_2$ transparent conductive film laminated thereon. There is also laminated on the transparent electrode film 12a a photoconductive layer 13 having a thickness of about 3 μm. The photoconductive layer 13 is made of hydrogenated amorphous silicon (a-Si:H). More particularly, this photoconductive layer 13 employs silane gas ($SiH_4$) and hydrogen gas ($H_2$) as raw materials and is laminated on the transparent electrode film 12a by means of a plasma CVD (Chemical Vapor Deposition) method.

Further, the photoconductive layer 13 provides a light-absorbing layer 14, which is a kind of an organic film, laminated on the overall surface of the photoconductive layer itself. This light-absorbing layer 14 is formed to have a thickness of about 1.5 μm by means of coating carbon-dispersed system coating material with a spinner, photo-polymerizing the coating material by exposing it, and sintering the polymerized material for five minutes at 200° C. The carbon-dispersed system coating material is formed by dispersing carbon black into an acrylic system resin so that the coating material may have a resistivity of $10^7 \Omega\cdot cm$ and a permeability of about 0.3% in a visible light range.

Figure 2:
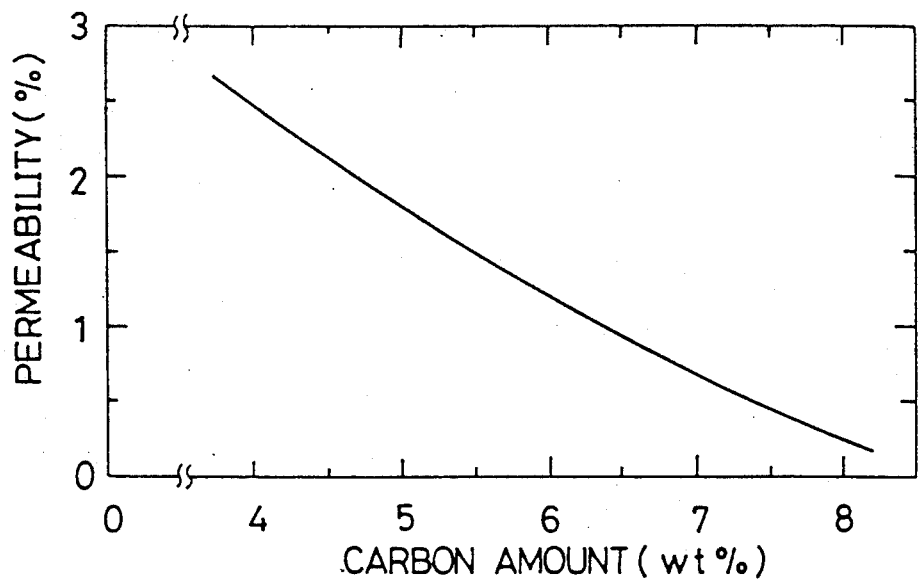
FIG. 2 is a characteristic graph showing a relation between permeability and a dispersed carbon amount.
Figure 3:
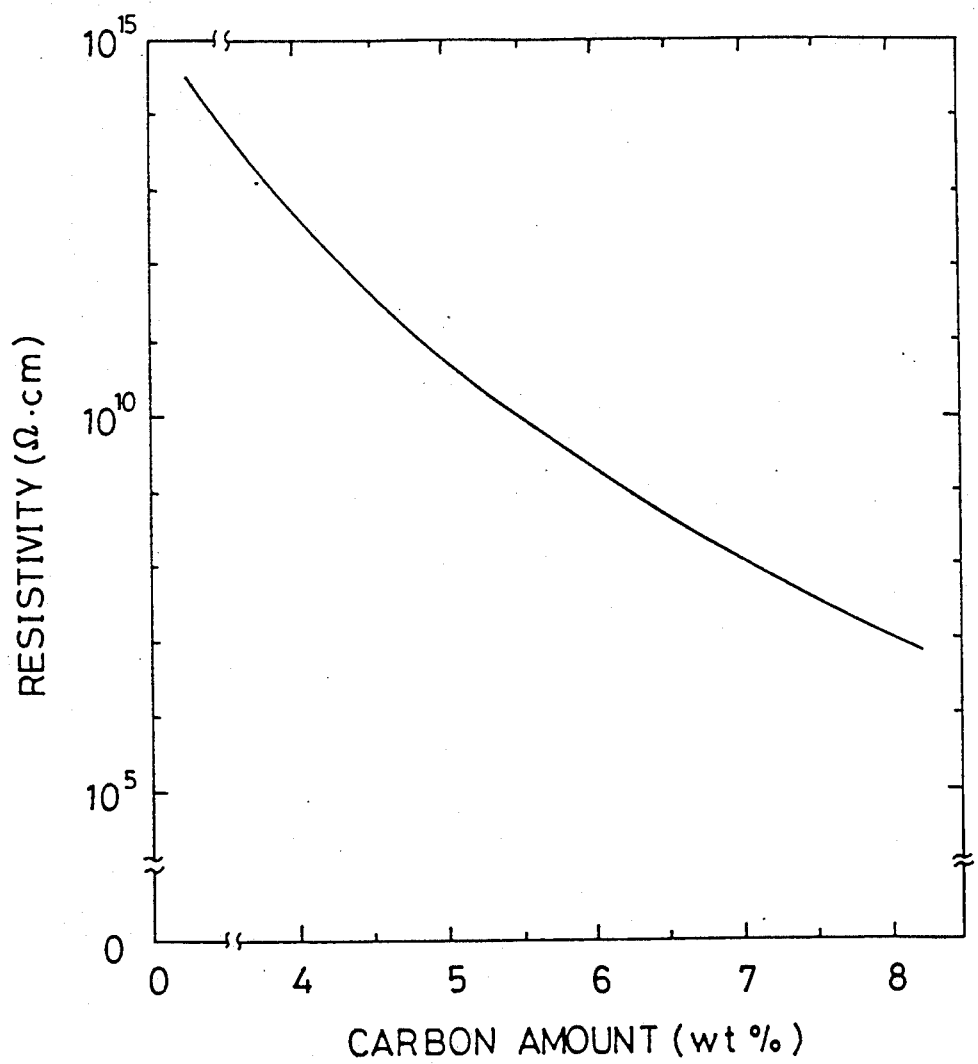
FIG. 3 is a characteristic graph showing a relation between resistivity and a dispersed carbon amount.

As shown in FIGS. 2 and 3, this kind of carbon system coating material changes its resistivity and permeability depending on the amount of the dispersed carbon. The light-absorbing layer formed of the carbon system coating material should preferably have a permeability of 0.5% or less and a resistivity of $10^6 \Omega\cdot cm$ or more.

The light-absorbing layer 14 provides a dielectric layer 15 laminated on the overall surface of the light-absorbing layer itself. This dielectric layer 15 is formed by alternately laminating silicon dioxide and titanium dioxide with the EB (Electron Beam) vaporing method.

The dielectric layer 15 should be preferably formed to have a thickness of about 2 μm and a reflectance of about 99%. Since the dielectric layer 15 is vapored on the light-absorbing layer 14, the dielectric layer 15 should be formed in the state of the base plate temperature of 250° C. or lower, more preferably, 200° C. or lower.

The dielectric layer 15 provides a liquid-crystal layer 16 laminated on the overall surface of the dielectric layer itself. The liquid-crystal layer 16 employs a dispersed type liquid-crystal compound film. The liquid-crystal compound film is formed by means of mixing 30 wt (weight) % of bifunctional acrylate formed of a UV polymerization compound (HX-620 manufactured by Nippon Kayaku Co., Ltd.), 70 wt % of nematic liquid-crystal (ZLI-3201-000 manufactured by Merck Co., Inc.), and a small amount of polymerization initiator (Darocurel 173 manufactured by Merck Co., Inc.), forming homogeneous solution consisting of those materials, filtering the homogeneous solution, coating the filtered solution on the dielectric layer 15 with a thickness of 10 μm by using a spinner, and exposing the coated film through ultraviolet rays.

The liquid-crystal layer 16 provides a transparent electrode film 12b and a glass plate 11b laminated on the overall surface of the liquid-crystal layer itself. The lamination consisting of the transparent electrode film 12b and the glass plate 11b is formed by laminating the transparent electrode 12b consisting of an ITO transparent conductive film on a glass plate 11b. The transparent electrode film 12b is formed on the glass plate 11b by means of the sputtering method.

17 denotes an a.c. (alternating current) power source which applies an a.c. voltage between the transparent electrode films 12a and 12b.

Assuming that a laser beam 18 comes in from the glass plate 11a when the a.c. voltage is applied therebetween, the photoconductive layer 13 corresponding to the laser-beam-applied portion lowers its impedance. The a.c. voltage is thus applied to the liquid-crystal layer 16, so that the liquid-crystal molecular orientation is changed. On the other hand, the photoconductive layer 13 corresponding to the portion except the laser-beam-applied portion keeps its impedance. The liquid-crystal molecules composing the liquid-crystal layer 16 keep the initial orientation. It results in forming the image corresponding to the incident beam on the liquid-crystal layer 16.

The present embodiment employs acrylic system resin as the carbon-dispersed system coating material used for forming the light-absorbing layer 14. It is possible to use as the coating material polyimide or polyamide, which are photo-polymerizing materials, or epoxy resin, which is a heat-polymerizing material.

In case the nematic liquid-crystal is used for the liquid-crystal layer 16, the liquid-crystal display mode may employ a dynamic scattering mode or a guest-host mode in addition to the case the liquid-crystal compound film described above is used. In case the smectic liquid-crystal is used, the guest-host mode can be employed.

Figure 4:
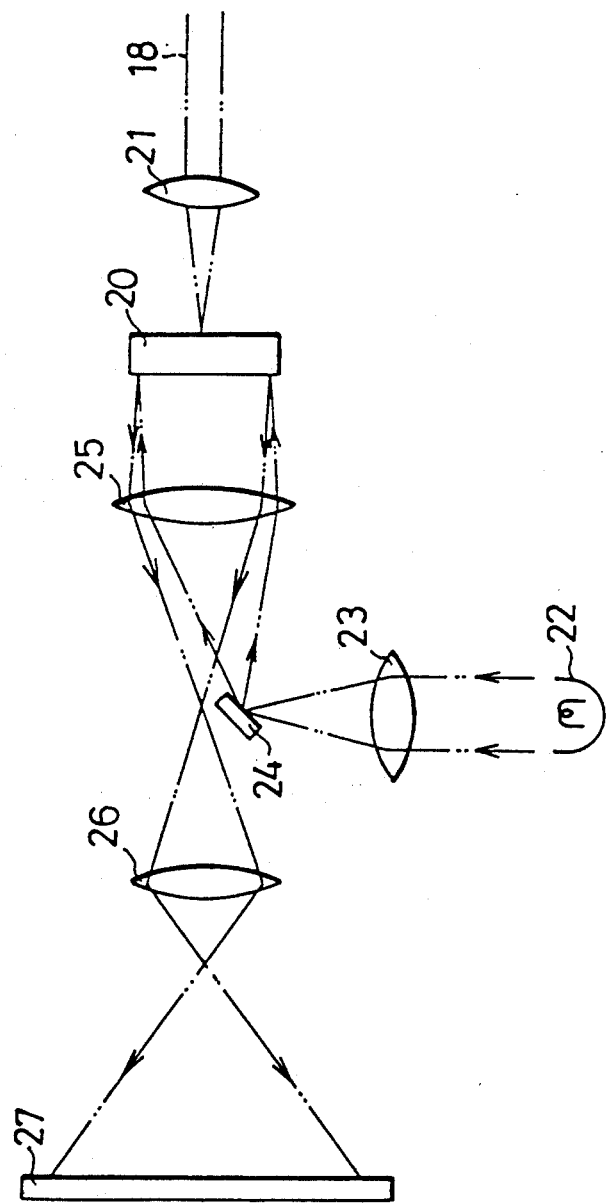
FIG. 4 is a schematic block diagram showing a projection type display device employing the liquid-crystal display device of optical writing type shown in FIG. 1 served as a light modulator.

FIG. 4 shows a schematic diagram showing a projection type display device having the liquid-crystal display device of optical writing type shown in FIG. 1 used as a light modulator.

As shown in FIG. 4 and FIG. 1, 20 denotes a liquid-crystal display device of optical writing type. An image is formed in advance on the liquid-crystal layer 16 included in the liquid-crystal display device of optical writing type 20. That is, as stated above, the laser beam 18 is applied to the glass plate 11a through a lens 21 so that the image is formed on the liquid-crystal layer 16.

22 denotes a light source which applies a ray of light to the glass plate 11b through a lens 23, a mirror 24 and a lens 25. The ray of light is scattered by the portion of liquid-crystal layer 16 which includes the liquid-crystal molecules keeping the initial orientation, so that the scattered ray does not reach the lens 25. The portion corresponding to the liquid-crystal molecules keeping the initial orientation is shown in the dark state on a screen 27. On the other hand, the liquid-crystal layer 16 becomes transparent in the portion of the liquid-crystal molecules changing their orientations. Hence, the ray of light is allowed to pass through the transparent portion of the liquid-crystal layer 16. The incoming ray of light is reflected on the dielectric layer 15 and the reflected ray of light is applied to a projection lens 26 through the lens 25 so that the reflected ray is expanded. Then, the expanded image is projected on the screen 27. That is, the image written in the liquid-crystal display device of optical writing type 20 is projected on the screen 27.

Figure 6:
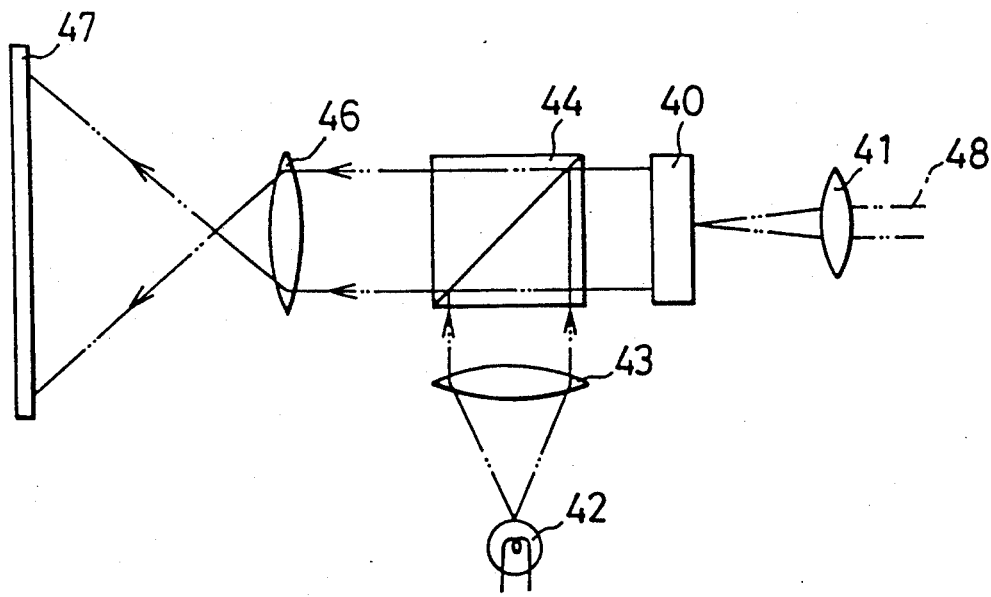
FIG. 6 is a schematic block diagram showing a projection type display device employing the liquid-crystal display device of optical writing type shown in FIG. 5.

The aforementioned projection type display device shown in FIG. 4 does not need a polarizing-type beam splitter, which is entailed in the projection type display device to be shown in FIG. 6. Hence, the projection type display device shown in FIG. 4 is allowed to display the brighter image on the screen 27.

Figure 5:
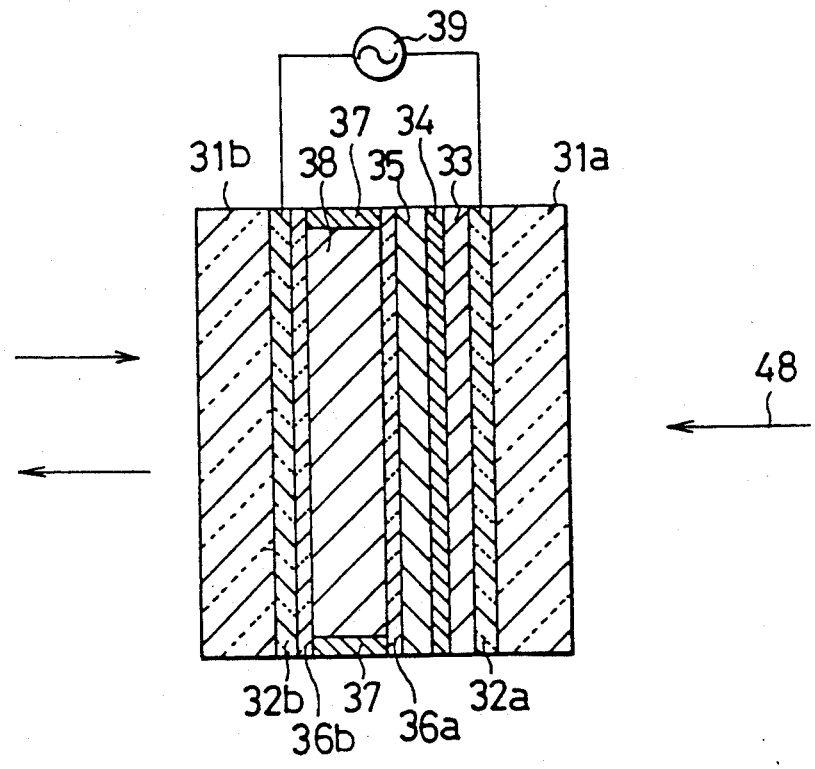
FIG. 5 is a sectional view showing a construction of a liquid-crystal display device of optical writing type according to another embodiment of the present invention.

FIG. 5 is a sectional view showing a liquid-crystal display device of optical writing type according to a second embodiment of the present invention.

As shown FIG. 5, 31a denotes a glass plate which provides a transparent electrode film 32a laminated thereon. The transparent electrode film 32a consists of an ITO transparent conductive film and an $SnO_2$ transparent conductive film. This transparent electrode film 32a is formed on the glass plate 31a by means of the sputtering method.

There is also laminated on the transparent electrode film 32a a photoconductive layer 33 having a thickness of about 3 μm. The photoconductive layer 33 is made of hydrogenated amorphous silicon (a-Si:H). More particularly, this photoconductive layer 33 employs as raw materials silane gas ($SiH_4$) and hydrogen gas ($H_2$) and is laminated on the transparent electrode film 12a by means of a plasma CVD method.

Further, the photoconductive layer 33 provides a light-absorbing layer 34, which is a kind of an organic film, laminated on the overall surface of the photoconductive layer itself. This light-absorbing layer 34 is formed to have a thickness of about 1.5 μm by means of coating carbon-dispersed system coating material with a spinner, photo-polymerizing the coating material by exposing it, and sintering the polymerized material for five minutes at 200° C. The carbon-dispersed system coating material is formed by dispersing carbon black into an acrylic system resin so that the coating material may have a resistivity of $10^7$ Ω.cm and a permeability of about 0.3% in a visible light range.

As shown in FIGS. 2 and 3, this kind of carbon system coating material changes its resistivity and permeability depending on the amount of the dispersed carbon. The light-absorbing layer formed of the carbon system coating material should preferably have a permeability of 0.5% or less and a resistivity of $10^6$ Ω.cm or more.

The light-absorbing layer 34 provides a dielectric layer 35 laminated on the overall surface of the light-absorbing layer itself. This dielectric layer 35 is formed by alternately laminating silicon dioxide and titanium dioxide with the EB vaporing method. The dielectric layer 35 should be preferably formed to have a thickness of about 2 μm and a reflectance of about 99%. Since the dielectric layer 35 is vapored on the light-absorbing layer 34, the dielectric layer 35 should be formed in the state of the base plate temperature of 250° C. or lower, more preferably, 200° C. or lower.

The dielectric layer 35 provides an orientation film 36a laminated thereon. This orientation film 36a is formed by spin-coating a polyimide film and adjusting the molecular orientation of the polyimide film by using the rubbing method.

As will be understood from FIG. 5, the orientation film 36a is pasted to the lamination composed of an orientation film 36b, a transparent electrode film 32b, and a glass plate 31b through two spacers 37. The lamination composed of the orientation film 36b, the transparent electrode film 32b, and the glass plate 31b is formed by laminating the transparent electrode film 32b made of an ITO transparent conductive film on the glass plate 31b and the orientation film 36b on the transparent electrode film 32b by means of the foregoing method. The transparent electrode film 32b and is formed on the glass plate 31b by the sputtering method.

An interval of about 6 μm is kept between the orientation films 36a and 36b. The liquid-crystal is injected and sealed in the space between these two films 36a and 36b for forming a liquid-crystal layer 38. The used liquid-crystal employs mixed nematic liquid-crystal formed by adding about 10 wt % of chiral material (S811 manufactured by Merck Co., Inc.) to nematic liquid-crystal in phenylcyclohexanone family. The liquid-crystal display device of optical writing type according to the present embodiment employs a phase transition mode as an operating mode.

39 denotes an a.c. power source which applies an a.c. voltage between the transparent electrode films 32a and 32b.

Assuming that a laser beam 48 comes in from the glass plate 31a when the a.c. voltage is applied therebetween, the photoconductive layer 33 corresponding to the laser-beam-applied portion lowers its impedance. The a.c. voltage is thus applied to the liquid-crystal layer 38, so that the liquid-crystal molecular orientation is changed. On the other hand, the photoconductive layer 33 corresponding to the portion except the laser-beam-applied portion keeps its impedance. The liquid-crystal molecules composing the liquid-crystal layer 38 keep the initial orientation. It results in forming the image corresponding to the incident beam on the liquid-crystal layer 38.

The present embodiment employs acrylic system resin as the carbon-dispersed system coating material used for forming the light-absorbing layer 34. It is possible to use as the coating material polyimide or polyamide, which are photo-polymerizing materials, or epoxy resin, which is a heat-polymerizing material.

In case the nematic liquid-crystal is used for the liquid-crystal layer 38, the liquid-crystal display mode may employ a twisted nematic mode, a field induced birefringence mode, or a hybrid field effect mode in addition to the phase transition described above. The liquid-crystal available in the liquid-crystal display device is ferroelectric liquid-crystal, antiferroelectric liquid-crystal, or smectic liquid-crystal providing an electro-clinic effect.

FIG. 6 is a schematic diagram showing a projection type display device having the liquid-crystal display device of optical writing type shown in FIG. 5 used as a light modulator.

As shown in FIG. 5 and FIG. 6, 40 denotes a liquid-crystal display device of optical writing type, An image is formed in advance on the liquid-crystal layer 38 included in the liquid-crystal display device of optical writing type 40. That is, as stated above, the laser beam 48 is applied to the glass plate 31a through a lens 41 so that the image is formed on the liquid-crystal layer 38.

42 denotes a light source which applies a ray of light to the glass plate 31b through a lens 43 and a polarizing-type beam splitter 44. The ray of light which is applied to the portion of liquid-crystal layer 38 including the liquid-crystal molecules keeping the initial orientation does not change the polarizing direction. It results in disallowing the ray of light reflected on the dielectric layer 35 to pass through the polarizing-type beam splitter 44. The portion corresponding to the liquid-crystal molecules keeping the initial orientation is shown in the dark state on a screen 47. On the other hand, the liquid-crystal layer 38 becomes transparent in the portion of the liquid-crystal molecules changing their orientation. The ray of light is allowed to pass through the transparent portion of the liquid-crystal layer 38. The incoming ray of light is reflected on the dielectric layer 35 and the reflected ray of light changes polarizing direction by means of an electrooptical effect. It results in allowing the ray of light reflected on the dielectric layer 35 to pass through the polarizing-type beam splitter 44. The ray of light passed through the polarizing-type beam splitter 44 is applied to a projection lens 46 in which the ray of light is expanded and then is projected onto the screen 47. Hence, the image written in the liquid-crystal display device of optical writing type 40 is projected on the screen 47.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid-crystal display device of optical writing type comprising:
   a first transparent substrate;
   a first transparent electrode layer formed on said first transparent substrate;
   a photoconductive layer formed on said first transparent electrode layer;
   a light-absorbing layer composed of a carbon-dispersed system coating material including an acrylic system resin, said light-absorbing layer formed on said photoconductive layer;
   a dielectric layer formed on said light-absorbing layer;
   a second transparent substrate;
   a second transparent electrode layer formed on said second transparent substrate; and
   a liquid-crystal layer disposed between said second transparent electrode layer and said dielectric layer.

2. A liquid-crystal display device according to claim 1, wherein said carbon-dispersed system coating material is formed to have a thickness of about 1.5 μm.

3. A liquid-crystal display device according to claim 2, wherein said carbon-dispersed system coating material has a resistivity of $10^7$ Ω.cm and a permeability of about 0.3% in a visible light range.

4. A liquid-crystal display device according to claim 1, wherein said first transparent substrate is consisted of a glass plate.

5. A liquid-crystal display device according to claim 1, wherein said first transparent electrode layer is composed of an ITO transparent conductive film.

6. A liquid-crystal display device according to claim 1, wherein said photoconductive layer is composed of hydrogenated amorphous silicon (a-Si:H) and is formed to have a thickness of about 3 μm.

7. A liquid-crystal display device according to claim 1, wherein said dielectric layer is formed of silicon dioxide and titanium dioxide being laminated alternately.

8. A liquid-crystal display device according to claim 7, wherein said dielectric layer is formed to have a thickness of about 2 μm and a reflection of 99%.

9. A liquid-crystal display device according to claim 1, wherein said liquid-crystal layer is formed by nematic liquid-crystal or smectic liquid-crystal.

10. A liquid-crystal display device according to claim 9, wherein said liquid-crystal layer includes a dispersed type liquid-crystal compound film formed of a film including bifunctional acrylate, nematic liquid-crystal and polymerization initiator, said bifunctional acrylate consisting of a UV polymerizing compound, said liquid-crystal layer formed on said dielectric layer and to have a thickness of 10 μm.

11. A liquid-crystal display device according to claim 1, wherein said second transparent substrate is consisted of a glass plate.

12. A liquid-crystal display device according to claim 1, wherein said second transparent electrode layer is composed of an ITO transparent conductive film.

13. A liquid-crystal display device according to claim 1, wherein said device comprises an a.c. power source for applying an a.c. voltage between said first and second transparent electrode layers.

14. A liquid-crystal display device according to claim 1, wherein said device comprises a first orientation film formed on said dielectric layer and a second orientation film formed on said second transparent electrode layer.

15. A liquid-crystal display device according to claim 14, wherein said first orientation film is formed of a polyimide film.

16. A liquid-crystal display device according to claim 1, wherein said device comprises sealing material which forms a periphery for sealing said liquid crystal layer.

17. A liquid-crystal display device of optical writing type comprising:
   a first transparent substrate;
   a first transparent electrode layer formed on said first transparent substrate;
   a photoconductive layer formed on said first transparent electrode layer;
   a light-absorbing layer composed of a carbon-dispersed system coating material including polyimide, polyamide, or epoxy resin, said light-absorbing layer being formed on said photoconductive layer;
   a dielectric layer formed on said light-absorbing layer;
   a second transparent substrate;
   a second transparent electrode layer formed on said second transparent substrate; and
   a liquid-crystal layer disposed between said second transparent electrode layer and said dielectric layer.

* * * * *